March 31, 1964 S. DUINKER 3,126,615

METHOD OF MANUFACTURING MULTIPLE MAGNETIC HEADS

Filed July 29, 1958

INVENTOR
SIMON DUINKER

BY Frank R. Trifari
AGENT

United States Patent Office 3,126,615
Patented Mar. 31, 1964

3,126,615

METHOD OF MANUFACTURING MULTIPLE MAGNETIC HEADS

Simon Duinker, Eindhoven, Netherlands, assignor to North American Philips Company, Inc., New York, N.Y., a corporation of Delaware Filed July 29, 1958, Ser. No. 751,666
Claims priority, application Netherlands Aug. 28, 1957
9 Claims. (Cl. 29—155.5)

This invention relates to methods of manufacturing multiple magnetic heads for recording or reproducing signals in a plurality of parallel tracks.

A method of construction is known, in which the multiple magnetic head is composed of two parts which are symmetrical with respect to the plane of the gap. Each of these parts is obtained by fixing the required number of halves of the heads, provided with their windings, with the desired spacing in a template and subsequently embedding them in, for example, araldite. After polishing the surfaces of the gap, the halves are placed against each other with the interposition of a plate of the required thickness to fill the gap. This method of construction has the disadvantage that for proper definition of the useful gap, it is necessary to polish not only the surfaces of said gap, but also those in the rear circuit which are located opposite the first-mentioned surfaces and which are not used as such.

Another disadvantage is that the halves of the heads are required to be shaped before being placed in the template. If this is effected by means of punching, the halves of the heads differ in dimensions as usually occurs with heads manufactured from laminated iron alloys, while when the halves of the heads are manufactured by sintering of ferrite materials moulded in a matrix, the structure of the material in the vicinity of the final gap is nonhomogeneous, with the result that the material crumbles off at this area and may also show differences in magnetic properties. After the embedding of the halves of the heads and the polishing of the surfaces of the gap, this may in either case result in differences in the length of the gap and in the inductance of the individual heads. Furthermore, the halves of the heads are liable to warp a little during the hardening of the resin, while the piece as a whole may warp due to contraction of the cast resin, resulting also in differences in the length of the gap and hence differences in sensitivity and, furthermore, in the width of the gap not being constant, which also leads to differences in sensitivity. Warping of the halves of the heads may also result in differences in the width of the track that can be effectively scanned by each individual head, and also in differences in the pitch of sequential heads and this, in turn, may lead to two adjacent tracks overlapping each other if two multiple heads are used in relatively shifted positions and even in that tracks of one head are situated between those of the other.

The method according to the invention overcomes these disadvantages in that the portion containing the (useful) gaps of the various individual (single) magnetic heads is processed as a whole into the desired shape (profile) and then supplemented with a corresponding number of closure pieces and windings for completion of the individual magnetic circuits.

According to a further feature of the method according to the invention, in order to avoid the use of expensive templates, the portion containing the gaps is manufactured by stacking a plurality of plates of magnetic material with the interposition of distance plates of non-magnetic material, an adhering layer being provided between every two plates (that is to say, between each magnetic plate and the adjacent distance plates), whereupon the assembly is compressed and pieces are sawed from the resulting blocks, the pieces being formed into a shape such as to have free extremities, which, after polishing constitute the surfaces of the gaps of the individual magnetic heads. The essential component parts of the magnetic circuit are thus not shaped beforehand.

Since the closure pieces carry the windings, it is usually necessary for the closure pieces to be shaped beforehand. However, since they do not contain the useful gap, preliminary shaping does not give rise to the above-mentioned difficulties. The closure pieces may be formed into any desired shape, for example, C-like, I-like, U-like, V-like etc.

Such shaped closure pieces may advantageously be formed into one piece by stacking a plurality of magnetic strips of, for example, U-like shape, provided with windings, with the interposition of spacing strips of non-magnetic material, while an adhering layer is provided between every two strips, whereupon the assembly is compressed. Such a piece may be combined in a simple manner with a corresponding piece, that is to say, the portion containing the gaps, to form a multiple magnetic head. Since, in the method according to the invention, it is not necessary for the blocks to be embedded, they cannot warp as a result of contraction of the cast resin.

The piece containing the gaps may be attached to the piece containing the closure pieces by means of a self-hardening polyester, but the two pieces may also be united by mechanical means. If, then, the portion containing the gaps becomes worn out as a result of strong contact with the tape, it may readily be replaced by a new one. The portion containing the closure pieces may also be rapidly replaced, if one or more of the windings deteriorate.

In many cases, it may be particularly advantageous for the closure pieces to be associated with the magnetic circuits as separate, loose parts, each provided with a winding. This can be achieved according to one embodiment of the invention if the method of manufacturing the portion containing the gaps is carried out so that the plates of magnetic material are of a width greater than that of the plates of non-magnetic material and that in the resultant grooves of the pieces sawed out of blocks there are arranged rods projecting from the pieces to an extent such that they can support at least the closure pieces. In this method, the closure pieces are stacked as loose parts on the various rods, so that spacer strips are not necessary.

The object of shaping the portion of the magnetic circuit containing the useful gap and of shaping the closure piece is to obtain winding space for the magnetic coil. However, if the pieces containing the surfaces of the gap, after being sawed out of the blocks, are formed into a shape such that the surface area of the free extremities, with a given width of the gap, is minimum, then in addition to a comparatively large winding space, the further advantage is obtained that the magnetic reluctance of the useful gap is maximum. The result thereof is that, for example in the reproducing process, a comparatively high voltage is induced in the coil surrounding the rear circuit. Furthermore, in view of the comparatively large winding space, the use of an I-like closure piece suffices, which may be manufactured in a simpler manner than one of, for example, C-, U- or V-like shape.

As with the closure pieces, the portion containing the gaps, when sawed out of a block, may have any possible shape. An additional advantage is obtained if the pieces sawed out of the blocks and constituting the pole-pieces of the various individual magnetic heads have a V-like shape. Since the pieces fit into one another, there is substantially no loss of material during the sawing process. Furthermore, this method affords the advantage that the time-consuming and expensive operation of grinding the plates for the blocks to the required thickness within the required tolerances is effected for a large number of pole-pieces simultaneously; this hardly involves additional grinding time, while the important advantage occurs that the dimensions of pole-pieces obtained after sawing and also those of the halves of the heads present therein and hence the pitch between sequential halves of the heads are exactly the same. This is very important in the future assembling of two pole-pieces, since it is now ensured that the two pole-pieces are "matched," that is to say, are exactly each other's reflection.

It is now possible in a simple manner to obtain the portion of the magnetic circuit containing the useful gaps, by sawing-through the pieces provided with polished surfaces, after which the surfaces of the gaps are properly spaced by means of gap-filling material and fixed in this position. It is then particularly advantageous for two corresponding pieces provided with polished surfaces and with the resultant surfaces of the gaps properly spaced by means of gap-filling material, to be fixed on each other and subsequently sawed through in accordance with a plane at right angles or substantially at right angles to the plane passing through the gaps, since the pieces thus provide parallel guidance for each other.

The plates of magnetic material and of non-magnetic material referred to in the foregoing may be adhered together with the use of solder, resin or similar material.

It is also desirable for the temperature, at which the surfaces of the gaps are fixed on one another, to be lower than the temperature at which the plates or strips of magnetic material and non-magnetic material are compressed to form one block, since otherwise the risk is involved of deterioration of the connection between the plates of magnetic material and those of non-magnetic material.

It is preferable for the rods, which fulfil the function of supports for the various individual closure pieces, to be made of electrically conductive, non-magnetic material, to which the ends of the windings are electrically connected.

For the gap-filling material use may be made of glass, enamel, copper beryllium or similar material.

In order that the invention may be readily carried into effect, several embodiments will now be described in detail, by way of example, with reference to the accompanying drawing, in which.

Figure 3:
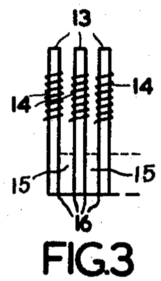
FIG. 3 is an elevation view of the portion of the magnetic head containing the closure pieces of the individual magnetic heads.
Figures 4, 5:
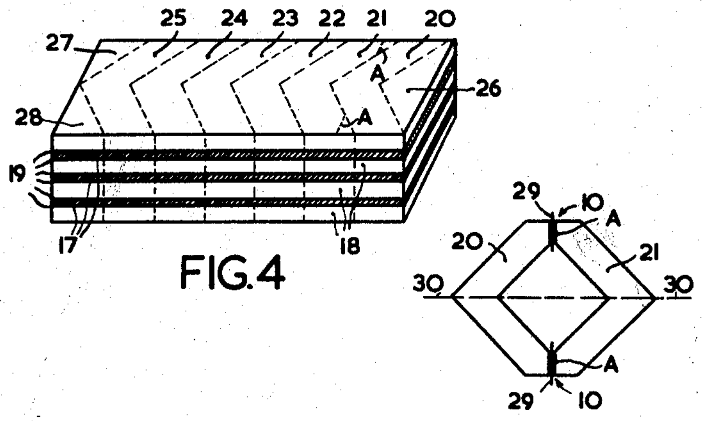
FIG. 4 is a perspective view of the manner in which the various layers are formed into one block, from which the pieces may be sawed, which constitute the portion containing the useful gaps of the individual magnetic heads.
Figure 6:
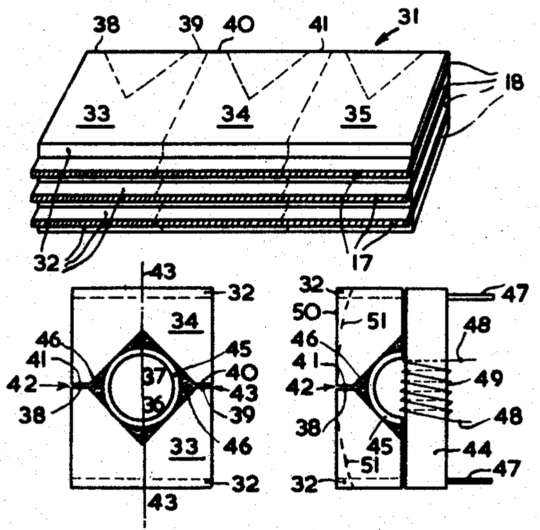

FIG. 5 illustrates the manner in which two corresponding pieces must be placed with the surfaces of their gaps against each other and are adhered together with the use of gap-filling material, whereupon, after sawing-through, two portions are obtained which are provided with plan parallel gaps which, each combined with a portion of FIG. 3, constitute a multiple magnetic head according to the invention, and FIG. 6 illustrates another method of manufacture in which the blocks are composed of plates of different width, resulting in grooves in which rods are arranged to support the closure pieces.

Figure 1:
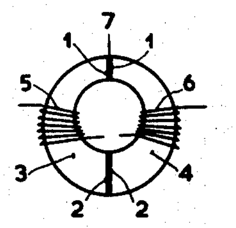
FIG. 1 is a side-view of a multiple magnetic head of known construction.

Reference is now made to the multiple magnetic recorder head of known construction as shown in side-view in FIG. 1. The two halves 3 and 4, located symmetrically with respect to the surfaces 1—1 and 2—2 of the gaps, are manufactured separately by fixing the required number of halves of the heads, provided with windings 5, 6 respectively, as a result of which preliminary shaping is necessary with the desired spacing in a template, and subsequently embedding them in, for example self-hardening polyester. For the preliminary shaping, one must have recourse either to a punching process, which gives rise to deterioration of the magnetic properties and to differences in dimensions of the halves of the head, or a moulding process with sintered ferrites being used for the magnetic circuits; the latter causes crumbling off of the material adjacent the surfaces of the final gaps and also results in inhomogeneities in the structure of the magnetic material and hence in variations in the magnetic properties. Fixation in a template is time-consuming due to the high degree of accuracy with which this operation must take place while the use of casting molds is in itself expensive. The contraction of the cast resin may cause disturbances of the distances (pitch) with which the halves of the heads were arranged in the template, resulting in differences in the effective width of the gaps and the tracks when the complex halves 3 and 4 are placed opposite each other. Furthermore, each of the halves is liable to warp throughout its length as a result of contraction after casting, so that the surfaces of the gaps are no longer located exactly in the same plane. This circumstance leads to a decrease and a variation in the sensitivity with which a magnetic track may, for example, be scanned. After polishing of the surfaces 1—1 and 2—2 of the gaps, the halves are placed against each other with the interposition of a thin plate 7 of the required thickness at the area where the surfaces 1—1 form the useful gap. However, the polishing of the surfaces 2—2, which is useful for the parallel guiding of the surfaces 1—1 of the effective gap, means a loss of working time, since this gap (2) in the rear circuit of the magnetic head is not used.

Figure 2:
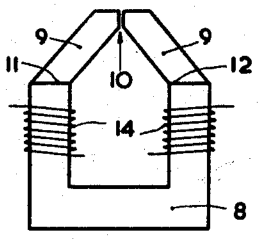
FIG. 2 is a side-view of the multiple magnetic head according to the invention.

FIG. 2 is a side view of the multiple magnetic head according to the invention, which is constituted by a portion 8 containing the closure pieces and a portion 9 containing the gaps 10 of the various individual (single) magnetic heads, which portions are manufactured separately. In composing the portions 8, 9, there occur, in addition to the useful gap 10, two gaps 11 and 12 at the junction surfaces of the two portions, which gaps are not used and hence need not be polished, since a simple grinding operation suffices to allow the influence of these gaps upon the inductance in the head to be maintained within determined limits, also on account of the large section of the magnetic circuit at this area, for which the magnetic reluctance is low.

FIG. 3 shows the manner in which the portion 8 of FIG. 2, which comprises the closure pieces, has been manufactured. A plurality of U-like strips 13 of magnetic material, for example of ferrite, provided with windings 14, are stacked with the interposition of spacing strips 15 of non-magnetic material, for example, aluminium oxide, an adhering layer 16 being provided between every two strips 13, 15, after which the assembly is compressed. The closure pieces are shaped beforehand and may have a C-like, I-like, U-like, V-like or similar shape.

FIG. 4 illustrates the method of manufacture of the portion 9 of FIG. 2, which contains the gaps 10. A plurality of plates 17 of magnetic material, for example of ferrite, are stacked together with the interposition of distance plates 18 of non-magnetic material, for example, aluminium oxide, an adhering layer 19 being provided between every two plates 17, 18, whereupon the assembly is compressed. The plates of magnetic material and of non-magnetic material may be processed at low costs, as they need only be ground to the required thickness. The use of distance plates also avoids an accurate, time-consuming relative adjustment of the corresponding parts of the various magnetic circuits. Since a cast resin is not required in this case, warping of the blocks is completely impossible. For example, C-like, I-like, U-like or V-like pieces are sawed out of the blocks thus formed. If, as shown in the figure, V-like pieces 20 to 25 are sawed out, the loss of material resulting from the pieces 26, 27, 28 is smallest as compared to the method in which pieces of other shape are sawed out. True, the loss of material is nil, if I-like pieces are sawed out of the block, but in order to obtain as much winding space as possible for the magnetic coil, the I-like pieces are formed afterwards into a shape such as to have free extremities for winding space and gap surfaces, so that ultimately material is also lost. The free extremities of the sawed pieces are subsequently polished, since they are intended to constitute the surfaces of the gap 10 of the individual magnetic heads.

On the one hand, a piece thus provided with polished surfaces may be sawed-through and the surfaces of the gap fixed on each other with the intermediary of gap-filling material of the required thickness, or on the other hand it is possible, as shown in FIG. 5, for two corresponding pieces with polished surfaces, for example 20 and 21, to be fixed with the resultant surfaces of their gaps on each other through the intermediary of gap-filling material 29—29 of the required thickness, followed by sawing-through in accordance with a plane (along the line 30—30 in the figure) at right angles to the plane passing through the gaps 10—10. The basis for the possibility of fixing together two corresponding pieces without differences in sensitivity occurring, for example in scanning, is provided in first instance by the simple assembly. This makes the method according to the invention suitable for mass production on account of the high extent of reproducibility in the manufacture of the pieces obtained thereby.

Several materials may be used as gap-filling material, dependent upon the requirements which the material has to fulfil. When the magnetic head during the recording or reproducing process is brought into contact with the magnetic record carrier, it is necessary, if use is made of ferrite for the material of the head, to utilize a material having the same resistivity to wear, for example glass or enamel, as the gap-filling material. If the magnetic recorder head does not come into contact with the magnetic record carrier, use may be made of softer materials, such as copper beryllium, self-hardening polyester (synthetic resin), lacquer, lime, cement or the like as a gap-filling material. Since it is desirable for the temperature at which the surfaces of the gap are fixed together, to be lower than the temperature at which the plates or strips of magnetic material and of non-magnetic material are compressed to form one block, the choice of the gap-filling material in this connection also imposes requirements upon the choice of the material for the adhering layer. When glass or enamel is used as the gap-filling material, a foil of solder is chosen as the adhering layer, in the other case the adhesion may be effected with self-hardening polyester, lacquer, lime or other self-hardening resins.

A slightly different embodiment of the method according to the invention is shown in FIG. 6, in which reference numeral 31 indicates a block manufactured by the method of FIG. 4, except that the magnetic plates 17 have a width larger than that of the distance plates 18. As a result of the width differences, grooves 32 are formed in the block. From the block 31 there are sawed I-like pieces 33, 34, 35, into which V-like grooves 36, 37, etc. are ground to obtain winding space for the magnetic coil. The resultant free extremities 38, 39, 40, 41, etc. are polished, whereafter in accordance with the method of FIG. 5, two corresponding pieces, for example 33 and 34, are fixed together with the intermediary of gap-filling material 42 of the required thickness. The resultant assembly of two pieces is then sawed through, in the figure along the line 43—43. When the V-like grooves to be ground into the I-like pieces are chosen very wide, so large a winding space results that I-like closure pieces 44 may be used, and the preliminary time-consuming shaping of the closure pieces becomes unnecessary. On the other hand, the remaining surface areas of the free extremities 38, 39 and 40, 41, respectively, of the pieces 33, 34, respectively, may be chosen so small that the reluctance of the useful gap 38—41 and 39—40, respectively, is maximum.

Since in this case breakage of the gap (42) may readily occur, precautions are taken in due time in that, during fixing the two corresponding pieces 33, 34, a tube 45, for example of glass, is arranged in the space of the grooves 36 and 37, which tube is secured with the use of synthetic resin (46) at the same time as the surfaces of the gap are fixed together.

After sawing through, a portion of the tube 45 remains in the space under the gap (42) so that it is sufficiently strengthened. Subsequently, rods 47 are arranged in the grooves 32, which rods project from the pieces to an extent such that they can easily support the closure pieces 44.

The rods 47 replace the distance strips between the closure pieces, so that the manufacture and stacking of the closure pieces becomes a very simple operation. Ultimately, the closure pieces are fixed in position, for example, by embedding them in synthetic resin.

If the rods 47 are of copper, they may be used to solder on them the extremities 48, 49 of windings 50 which, on the one hand, affords the possibility to measure the magnetic coil 49 even at this stage and, on the other hand, permits of rapidly establishing the connections 48, 49 of the coil 50.

In conclusion, it is possible for the surface 50 of the multiple magnetic head manufactured by the method according to the invention to be rounded, as indicated in FIG. 6 by the dotted line 51, resulting in a guide surface for a magnetic carrier having more than one track.

What is claimed is:

1. A method of manufacturing a multiple magnetic head for recording, reproducing or erasing signals in a plurality of parallel tracks, each head including a gap portion and a closure piece, comprising the steps of adhering to each other in the form of a block a solid plurality of magnetic strips of magnetic material and a plurality of spacing strips of non-magnetic material by applying an adhesive layer between every two strips and compressing said strips against each other, each pair of magnetic strips being separated from each other by a spacing strip, sawing the resultant block into pieces having a desired gap portion form and at least one gap surface, forming a gap by placing two of said pieces adjacent each other with a gap-filling material interposed between two gap surfaces, and attaching to each pair of said pieces comprising a gap a closure piece composed of alternate layers of magnetic and non-magnetic material the magnetic and non-magnetic layers of each closure piece being aligned with the magnetic and non-magnetic strips, respectively, of the associated gap portion pieces.

2. A method as claimed in claim 1, wherein said closure piece is made by adhering to each other a plurality of magnetic strips of magnetic material and a plurality of spacing strips of non-magnetic material, the magnetic strips being separated from each other by the spacing strips, and said attachment is made by applying an adhesive layer between each said gap portion piece and said closure piece and compressing the gap portion piece and the closure piece.

3. A method of manufacturing a multiple magnetic head for recording, reproducing or erasing signals in a plurality of parallel tracks, each head including a gap portion and a closure piece, comprising the steps of stacking up a plurality of unprofiled, rectangularly cross-sectioned magnetic plates of magnetic material, interposing a plurality of spacing plates of non-magnetic material between said magnetic plates, applying an adhesive layer between each pair of plates, compressing the resultant block of material until adhesion results, sawing pieces having a desired gap portion shape and at least one gap surface from said block, polishing the gap surfaces of said pieces, forming a gap by placing two of said pieces adjacent to each other with a gap-filling material interposed between two gap surfaces, and attaching to each pair of said pieces comprising a gap a closure piece composed of alternate layers of magnetic and non-magnetic material the magnetic and non-magnetic layers of each closure piece being aligned with the magnetic and non-magnetic strips, respectively, of the associated gap portion pieces.

4. A method as claimed in claim 3, wherein said closure piece is made by stacking up a plurality of magnetic plates of magnetic material, interposing a plurality of spacing plates of non-magnetic material between said magnetic plates, applying an adhesive layer between each pair of plates, compressing the plates until adhesion results, and attaching said closure piece to said gap portion piece by applying an adhesive layer and compressing until adhesion occurs.

5. A method of manufacturing a multiple magnetic head for recording, reproducing or erasing signals in a plurality of parallel tracks, each head including a gap portion and a closure piece, comprising the steps of stacking up a plurality of magnetic plates of magnetic material having a predetermined width and an unprofiled, rectangular cross-section, interposing between said magnetic plates a plurality of spacing plates of non-magnetic material also having an unprofiled, rectangular cross-section and a width less than said predetermined width, thereby forming grooves along said spacing plates in the direction of width, applying an adhesive layer between each pair of plates, compressing the plates until adhesion occurs, sawing pieces having a desired gap portion shape and at least one gap surface from each of said pieces, forming a gap by placing two of said pieces adjacent to each other with a gap-filling material interposed between two gap surfaces, and attaching to each pair of said plates comprising a gap a closure piece including plates of magnetic material, the magnetic plates of said closure pieces being placed adjacent to the magnetic plates of said gap portion pieces.

6. A method as set forth in claim 5, further comprising the steps of placing a rod having a cross-sectional area substantially equal to the depth of a spacing plate in each of said grooves, and attaching the closure piece to said plates by juxtaposing the closure piece to the magnetic plates and said rods and supporting the closure piece by placing said rods between pairs of magnetic plates of said closure pieces.

7. A method as claimed in claim 6, wherein the rods are composed of an electrically-conductive, non-magnetic material.

8. A method of manufacturing a multiple magnetic head for recording, reproducing and erasing signals in a plurality of parallel tracks, each head including a gap portion and a closure piece, comprising the steps of stacking up a plurality of unprofiled, rectangularly cross-sectioned plates of magnetic material and a plurality of spacing plates of non-magnetic material, each spacing plate being interposed between two magnetic plates, applying adhesive to said plates, compressing the resulting block of material, first sawing a plurality of pieces having a substantially V-shape from said block, each V-shaped piece having free extremities and an axis parallel to said extremities and substantially bisecting the included angle of the V, second sawing each V-shaped piece perpendicular to said axis at said extremities, said second sawing exposing gap surfaces on said pieces, polishing said surfaces, interposing a non-magnetic gap-filling material between two of said corresponding surfaces, pressing corresponding surfaces of different V-shaped pieces together against said gap-filling material, sawing each piece along said axis to form halves and attaching to each of said halves at the surface formed by the last-mentioned sawing step a closure piece composed of alternate strips of magnetic and non-magnetic material.

9. A method of manufacturing a multiple magnetic head for recording, reproducing and erasing signals in a plurality of parallel tracks, each head including a gap portion and a closure piece, comprising the steps of stacking up a plurality of unprofiled, rectangularly cross-sectioned plates of magnetic material and a plurality of spacing plates of non-magnetic material, each spacing plate being interposed between two magnetic plates, applying adhesive to said plates, said adhesive having a first predetermined melting point, compressing the resulting block of material, first sawing a plurality of pieces having a substantially V-shape from said block, each V-shaped piece having free extremities and an axis parallel to said extremities and substantially bisecting the included angle of the V, second sawing each V-shaped piece perpendicular to said axis at said extremities, said second sawing exposing gap surfaces on said pieces, polishing said surfaces, interposing a non-magnetic gap-filling material between two of said corresponding surfaces, said gap-filling material having a second predetermined melting point lower than said first one, heating each V-shaped piece to said second melting point, pressing corresponding surfaces of different V-shaped pieces together against said gap-filling material until the desired gap length is achieved, cooling said V-shaped pieces, sawing each piece along said axis to form halves and attaching to each of said halves at the surface formed by the last-mentioned sawing step a closure piece composed of alternate strips of magnetic and non-magnetic material.

References Cited in the file of this patent

UNITED STATES PATENTS

| | | |
|---|---|---|
| 567,250 | Moody | Sept. 8, 1896 |
| 2,234,214 | Young | Mar. 11, 1941 |
| 2,280,981 | Schuh | Apr. 28, 1942 |
| 2,318,095 | Putman | May 4, 1943 |
| 2,481,393 | Camras | Sept. 6, 1949 |
| 2,579,560 | Ford | Dec. 25, 1951 |
| 2,615,990 | Blaney et al. | Oct. 28, 1952 |
| 2,662,120 | Anderson | Dec. 8, 1953 |
| 2,680,285 | Furnas | June 8, 1954 |
| 2,872,530 | Jolly | Feb. 3, 1959 |
| 2,902,544 | Barry | Sept. 1, 1959 |